ROOM TEMPERATURE FERROELECTRIC MATERIALS

Filed July 8, 1960

INVENTOR
THOMAS G. DUNNE
BY [signature]
ATTORNEY

United States Patent Office 3,023,167

Patented Feb. 27, 1962

3,023,167

ROOM TEMPERATURE FERROELECTRIC MATERIALS

Thomas G. Dunne, Poughkeepsie, N.Y., assignor to International Business Machines Corporation, New York, N.Y., a corporation of New York Filed July 8, 1960, Ser. No. 41,527

5 Claims. (Cl. 252—63.2)

This invention relates to ferroelectric materials and more particularly to a new class of ferroelectrics exhibiting a spontaneous polarization at room temperature.

As is known in the art, the so-called ferroelectric characteristic manifests itself as a resultant or spontaneous polarization, in the material following the application and removal of a force applied thereto. As is also well known in the art, only a limited number of materials are known to exhibit this property.

The present invention adds a new class of ferro-electric materials to those previously available to the art. The new class comprises mixed crystals of compounds having the general formula:

$$M_1^{+2}M_2^{+3}X_4^{-2}$$

designated as group I and $$M_1^{+2}M_2^{+1}X_4^{-1}$$

designated as group II, wherein the M and X elements are related by a similar ionic crystalline radii as will be set forth hereinafter.

Stated in terms of a composite formula representing a combination of group I and group II, the materials of the present invention include compounds within the class:

$$M_1^{+2}M_{2x}^{+1}M_{2-2x}^{+3}X_{4x}^{-1}X_{4-4x}^{-2}$$

A preferred subclass of compounds of the present invention are those having the general formula:

$$BaLi_{2x}Al_{2-2x}F_{4x}O_{4-4x}$$

where "*x*" preferably ranges from 0.15–0.30.

As is recognized in the art, ferroelectric materials have found use in a number of practical devices, including dielectric amplifiers, non-linear capacitors and memory elements in computer circuitry. In use in the latter application, it is highly desirable that the material exhibit a relatively low coercive force, a high spontaneous polarization, and a more nearly rectangular hysteresis loop characteristic. Another particularly sought after feature for ferroelectric materials used as memory elements is that they be capable of operation at or near room temperature, i.e., that they exhibit a spontaneous polarization in this temperature range.

Accordingly, it is a general object of the present invention to provide a new class of useful ferroelectric materials exhibiting a spontaneous polarization at or near room temperature.

The foregoing and other objects, features and advantages of the invention will be apparent from the following more particular description of preferred embodiments of the invention, as illustrated in the accompanying drawings.

In the drawings:

FIGURE 1 shows a typical ferroelectric hysteresis loop characteristic of the ferroelectric mixed crystals in accordance with the present invention, having the formula:

$$BaLi_{0.6}Al_{1.4}F_{1.2}O_{2.8}$$

The general process of the preparation of the mixed ferrolectric crystals of the present invention may be illustrated with reference to the following specific examples.

EXAMPLE I

Accordingly, LiF (12.07 grams), $BaF_2$ (87.68 grams) and $AlF_3 \cdot 3H_2O$ (0.34 gram) were heated at elevated temperatures, preferably at about 1300° C., for about 4 hours in air in a 250 cc. platinum crucible and cooled slowly, suitably at the rate of about 40° C. per hour, to below about 800° C., the furnace thereafter shut off and the mass cooled to room temperature. The resulting product consisted of a large polycrystalline mass interspersed with a smaller amount of hexagonal platelets of about 1 to 4 mm.² in area and about 0.1 mm. thick. The platelets then were collected by mechanical separation from the polycrystalline mass. The mixed crystal platelets analyzed to be the composition $BaLi_{0.32}Al_{1.68}F_{0.64}O_{3.36}$.

EXAMPLE II

Following the procedure described in Example I, LiF (12.07 grams), $BaF_2$ (87.68 grams) and $AlF_3 \cdot 3H_2O$ (0.38 gram) yielded a mixed ferroelectric crystal which analyzed to be $BaLi_{0.4}Al_{1.6}F_{0.8}O_{3.2}$.

EXAMPLE III

As above, LiF (12.07 grams), $BaF_2$ (87.68 grams) and $AlF_3 \cdot 3H_2O$ (8.5 grams) gave a mixed crystal which analyzed $BaLi_{0.6}Al_{1.4}F_{1.2}O_{2.8}$.

The table shows the variation of some electrical properties as the composition of the mixed crystal is changed in the formula $BaLi_{2x}Al_{2-2x}F_{4x}O_{4-4x}$, where P is the spontaneous polarization at 25° C., $E_c$ is the coercive field at 25° C., $T_c$ is the Curie temperature and $\epsilon_{Tc}/\epsilon_{25°}$ C. is the ratio of the dielectric constant at the Curie temperature to that at 25° C.

*Table*

| $x$ | $\epsilon_{Tc}/\epsilon_{25°}$C. | $T_c$° C. | P$\mu$c/cm.² | $E_c$kv./cm. |
|---|---|---|---|---|
| 0.30 | 1.27 | 148 | 0.08 | 7.0 |
| 0.20 | 1.51 | 127 | 0.10 | 8.5 |
| 0.15 | 1.68 | 140 | 0.14 | 20.1 |

The crystal structure of the mixed ferroelectric crystals of the present invention possesses a hexagonal unit cell. For example, the compound $BaLi_{0.6}Al_{1.4}F_{1.20}O_{2.8}$ has the unit cell dimensions $a$=10.44 A. and $c$=8.77 A. Ferroelectric crystals isomorphous with the base system, $BaLi_{2x}Al_{2-2x}F_{4x}O_{4-4x}$, are produced by replacing one or more of the ions in the crystal lattice by another of the same valence and of nearly the same size. For example, $Ba^{+2}$ is suitably replaced by the ions, $UO_2^{+2}$, $Cu(NH_3)_4^{+2}$ or $Ni(NH_3)_6^{+2}$. Similarly, $Al^{+3}$ may be replaced by the trivalent cations $Ga^{+3}$, $Cr^{+3}$ and $Rh^{+3}$.

In a similar manner, ferroelectric crystals are produced by substituting $Na^+$ and $K^+$ into the preferred crystal structure for $Li^+$. $Cl^{-1}$ and $Br^{-1}$ also substitute for fluoride in the crystal lattice.

Figure 1:
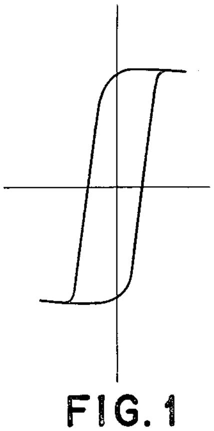
Figure 2:
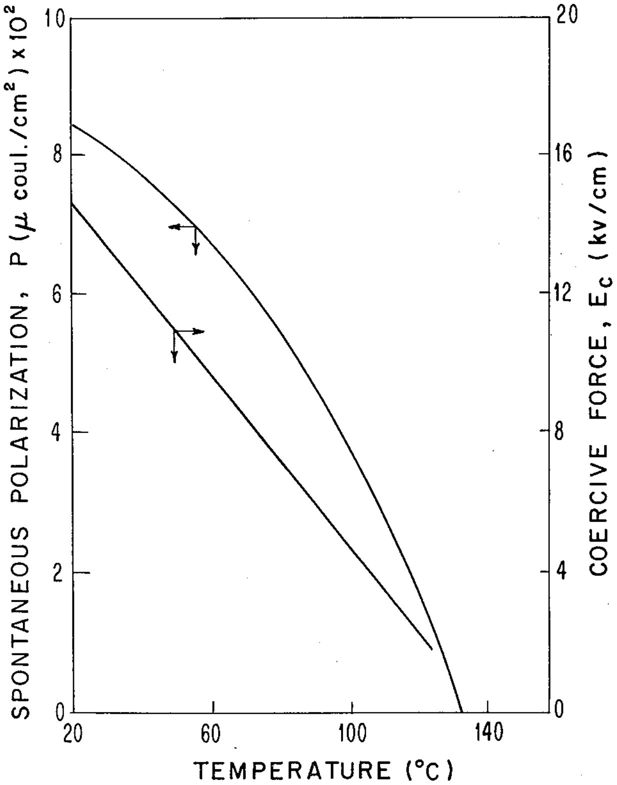
FIGURE 2 is a graphic representation of spontaneous polarization and coercive fields plotted as a function of temperature for the same composition.
Figure 3:
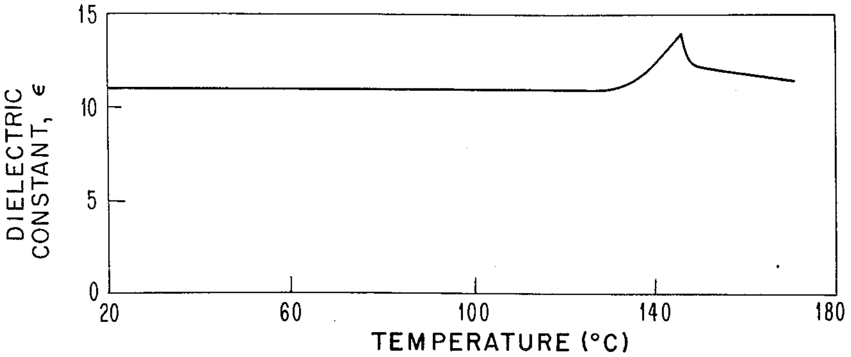
FIGURE 3 is a graph of dielectric constant versus temperature for the same typical mixed crystal composition.

In order to aid those skilled in the art to use the novel ferroelectric materials of the present invention the following typical physical properties and device performance will now be presented with reference to FIGURES 1–3. As shown in FIGURE 1, for a typical material of the present invention, $BaLi_{0.6}Al_{1.4}F_{1.2}O_{2.8}$, it is seen that they exhibit a nearly rectangular hysteresis loop which makes them especially desirable for use as memory elements in computer circuitry. In FIGURE 2 there is shown curves of the relatively slight variation of the spontaneous polarization and coercive field versus temperature over the range from room temperature to about 140° C. The dielectric constant as a function of temperature is shown in FIGURE 3, the Curie temperature being about 140° C. accompanied by a slight increase in the dielectric constant. The switching interval from one state of polarization to another is approximately 5 microseconds for 300 volt pulses applied to a crystal of 0.1 millimeter in thickness, which indicates that high speed switching devices may be constructed using the materials of the present invention.

While the invention has been particularly shown and described with reference to preferred embodiments thereof, it will be understood by those skilled in the art that various changes in form and details may be made therein without departing from the spirit and scope of the invention.

What is claimed is:

1. A ferroelectric material having the formula $$BaLi_{2x}Al_{2-2x}F_{4x}O_{4-4x}$$

wherein "$x$" ranges from 0.15–0.30.

2. A room temperature ferroelectric having the formula $BaLi_{0.32}Al_{1.68}F_{0.64}O_{3.36}$.

3. A single crystal, room temperature ferroelectric having the formula $BaLi_{0.6}Al_{1.4}F_{1.2}O_{2.8}$ which has the hexagonal unit cell dimensions $a$=10.44 A. and $c$=8.77 A.

4. A method of making a room temperature ferroelectric crystal which has the formula $BaLi_{2x}F_{4x}O_{4-4x}$ wherein "$x$" ranges from 0.15–0.30 comprising the steps of heating 12.07 grams of LiF, 87.68 grams $BaF_2$ and between 0.34 and 8.5 grams $AlF_3 \cdot 3H_2O$ at about 1300° C. for about 4 hours in air and cooling at the rate of about 40° C. per hour to below about 800° C. and thereafter cooling the mass to room temperature and separating the hexagonal crystals from the mass.

5. The method according to claim 4 wherein $x$=0.15 and the amount of $AlF_3 \cdot 3H_2O$ is 0.34 gram.

References Cited in the file of this patent

UNITED STATES PATENTS

| | | |
|---|---|---|
| 2,899,321 | Mockrin | Aug. 11, 1959 |
| 2,934,443 | Shell et al. | Apr. 26, 1960 |
| 2,945,744 | Knox | July 19, 1960 |
| 2,952,514 | Smith | Sept. 13, 1960 |
| 2,954,300 | Triebwasser | Sept. 27, 1960 |